United States Patent [19]
Hemphill et al.

[11] Patent Number: 5,083,268
[45] Date of Patent: Jan. 21, 1992

[54] SYSTEM AND METHOD FOR PARSING NATURAL LANGUAGE BY UNIFYING LEXICAL FEATURES OF WORDS

[75] Inventors: Charles T. Hemphill, Coppell; Frank Vlach, Plano, both of Tex.

[73] Assignee: Texas Instruments Incorporated, Dallas, Tex.

[21] Appl. No.: 574,557

[22] Filed: Aug. 27, 1990

Related U.S. Application Data

[63] Continuation of Ser. No. 919,156, Oct. 15, 1986, abandoned.

[51] Int. Cl.⁵ .............................................. G06F 15/38
[52] U.S. Cl. ................................... 395/12; 364/419; 364/274.8; 364/274.1; 364/274; 364/274.2; 364/274.3; 364/274.5; 364/DIG. 1; 395/902
[58] Field of Search ... 364/200 MS File, 900 MS File, 364/513, 419

[56] References Cited

U.S. PATENT DOCUMENTS

| | | | |
|---|---|---|---|
| 4,638,445 | 1/1987 | Mattaboni | 364/513 |
| 4,648,044 | 3/1987 | Hardy et al. | 364/513 |
| 4,661,924 | 4/1987 | Okamoto et al. | 364/900 |
| 4,670,848 | 6/1987 | Schramm | 364/513 |
| 4,674,066 | 6/1987 | Kucera | 364/900 |
| 4,688,195 | 8/1987 | Thompson et al. | 364/300 |
| 4,706,212 | 11/1987 | Toma | 364/900 |
| 4,724,523 | 2/1988 | Kucera | 364/419 |
| 4,744,050 | 5/1988 | Hirosawa et al. | 364/900 |
| 4,787,035 | 11/1988 | Bourne | 364/300 |
| 4,787,038 | 11/1988 | Doi et al. | 364/419 |
| 4,791,587 | 12/1988 | Doi | 364/900 |
| 4,816,994 | 3/1989 | Freiling et al. | 364/200 |
| 4,829,423 | 5/1989 | Tennant et al. | 364/200 |

OTHER PUBLICATIONS

Rich, E., "Artificial Intelligence", 1983, pp. 320–322.
Winograd, T., "Language as a Cognitive Process", 1983, pp. 116–127.

*Primary Examiner*—Gareth D. Shaw
*Assistant Examiner*—Kevin A. Kriess
*Attorney, Agent, or Firm*—L. Joy Griebenow; James T. Comfort; Mel Sharp

[57] ABSTRACT

A method for parsing for natural languages includes a grammar and a lexicon. A knowledge base may be used to define elements in the lexicon. A processor receives single words input by a user and adds them to a sentence under construction. Valid next words are predicted after each received input word. The preferred system has two major components: a parser and a predictor. The predictor accesses only the lexicon and the knowledge base, if one is used, to determine the valid next input words. The parser constructs sentences which are valid according to the grammar out of words accepted by the predictor.

19 Claims, 4 Drawing Sheets

```
S(VP + {SUBJ( LEX(YOU) )} )- - -> VP(VP).
VP(V + {OBJ(NP)} )- - -> VERB (V), NP(NP).
NP(D + N)- - -> DETERMINER(D), NOUN(N).

FEATURES(VERB({LEX(_), PRED(_), SUBJ(_), OBJ(_)})).
FEATURES(NOUN({LEX(_), NUM(_), SOUND (_)})).
FEATURES(DETERMINER ({SPEC(_), SPEC_TYPE(_), NUM(_), SOUND(_)})).
```

Fig. 2

```
DETERMINER({SPEC(A),SPEC_TYPE(INDEF),NUM(SINGULAR),SOUND(CONSONANT)}) :-- TRUE.
DETERMINER({SPEC(AN),SPEC_TYPE(INDEF),NUM(SINGULAR),SOUND(VOWEL)}) :-- TRUE.
DETERMINER({SPEC(THE),SPEC_TYPE(DEF)}) :-- TRUE.

NOUN({LEX(TALK),STEM(TALK),NUM(SINGULAR),SOUND(CONSONANT)}) :-- TRUE.
NOUN({LEX(TALKS),STEM(TALK),NUM(PLURAL),SOUND(CONSONANT)}) :-- TRUE.
NOUN({LEX(INTERVIEW),STEM(INTERVIEW),NUM(SINGULAR),SOUND(VOWEL)}) :-- TRUE.
NOUN({LEX(INTERVIEWS),STEM(INTERVIEW),NUM(PLURAL),SOUND(VOWEL)}) :-- TRUE.

VERB({LEX(SCHEDULE),PRED(SCHEDULE(SUBJ,OBJ))}) :-- TRUE
VERB({LEX(ARRANGE),PRED(ARRANGE(SUBJ,OBJ))}) :-- TRUE.
```

Fig. 3

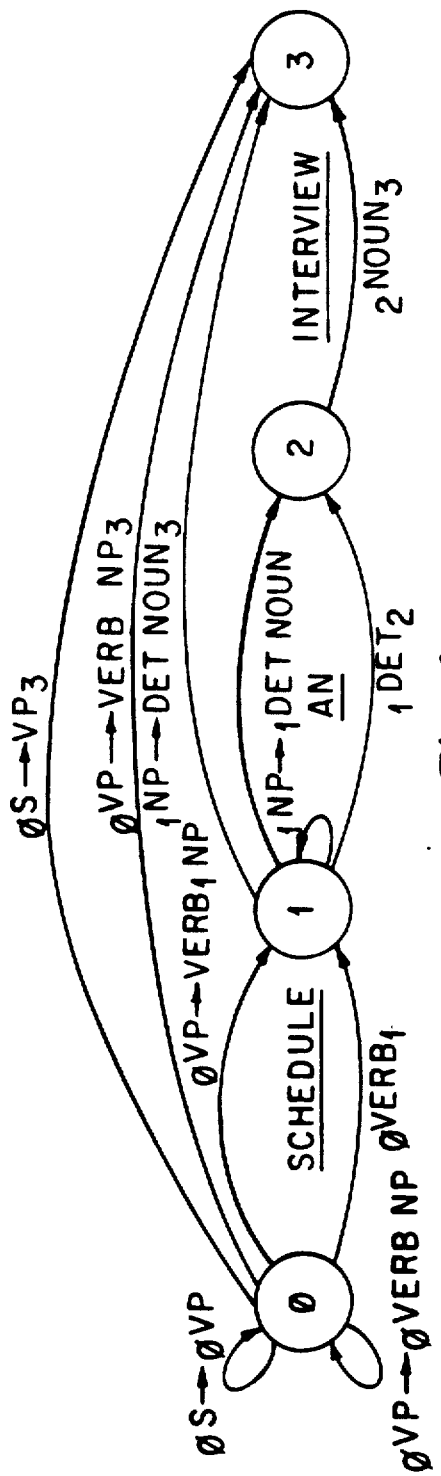
Fig. 4
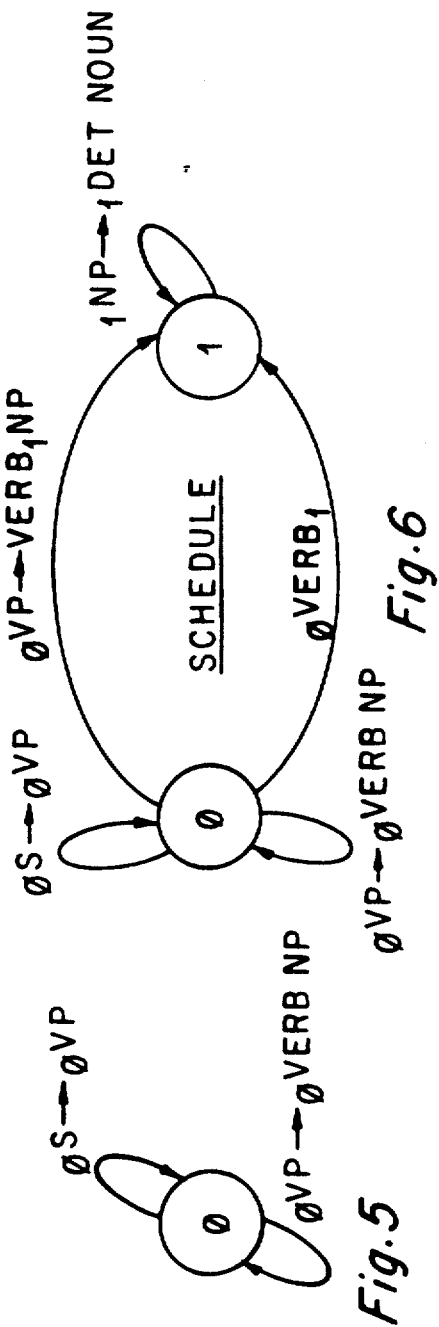
Fig. 6
Fig. 5

SYSTEM AND METHOD FOR PARSING NATURAL LANGUAGE BY UNIFYING LEXICAL FEATURES OF WORDS

This application is a continuation, of application Ser. No. 06/919,156, filed Oct. 15, 1986, now abandoned.

BACKGROUND AND SUMMARY OF THE INVENTION

The present invention relates to natural language interfaces, and more specifically to a natural language processor which predictively parses an input stream of words.

In traditional natural language interfaces, the user frequently overshoots the capabilities of the system. This occurs because traditional interfaces do not yet cover all of English grammar and the user is unaware of the subset of natural language which the interface does cover. Users enter entire sentences only to discover that the system can not understand these sentences. Furthermore, once the user discovers that the interface does not cover certain linguistic ground, the user may undershoot the capabilities of the system; there are capabilities in the system that the user does not know about and fails to discover.

In summary, there is no straightforward route to matching the covered sublanguage of the traditional text entry natural language interfaces with the sublanguage the user naturally uses. These problems do not exist in NLMenu. an interfacing methodology developed at Texas Instruments. In that product, menus guide the user to select only sentences which the system understands. The NLMenu system offers a more comfortable environment and encourages the user to explore the system's capabilities interactively. Selection of lexical items from windows also eliminates spelling errors.

With guided query composition, grammars and lexicons become much smaller. This is in contrast to traditional natural language interfaces, where a considerable amount of effort must be expended to develop a large grammar in an attempt to cover all possible linguistically correct inputs within a given domain.

NLMenu uses a semantic grammar as its underlying formalism to cover the grammar which the interface supports. A semantic grammar is a context-free grammar where the choice of terminals and nonterminals is governed by semantic as well as syntactic function. (Semantic grammars are described in the book Artifical Intelligence by Elaine Rich, in Chapter 9.) Therefore, only semantically meaningful sentences are formed. This is not necessarily true for a system which performs syntactic parsing first followed by a check on semantic constraints and compositionality. Semantic grammars can also be written to accept not strictly syntactically correct sentences and still produce semantically meaningful results (e.g., "What is weight of car?"). LADDER was one of the largest systems developed using a semantic grammar. (LADDER is described in "Developing a Natural Language Interface to Complex Data", Hendrix, et al, ALM Transactions on Database Systems. Volume 3, 1978. )

NLMenu provides a semantic grammar with one degree of domain independence without changing the grammar: interfaces to databases may be generated with minimal effect. It accomplishes this by instantiating a set of grammar and lexicon rules at interface creation time with appropriate items from the database scheme. The uninstantiated grammar and lexicon are called the "core grammar" or "generic grammar."

Unfortunately, NLMenu still suffers the ills of other semantic grammar based interfaces. Even though domain independence has been achieved within the database realm, it is not especially easy to transport the syntactic knowledge to a new, non-relational domain. This becomes clear upon examination of the grammar; it knows about modifying phrases for relations within the database scheme, but it does not know about modifying phrases in general. Additionally, while the number of uninstantiated grammar and lexicon rules is small, the number of instantiated rules, generated at compile time, grows quite rapidly with the domain size. There are two fundamental reasons for this. First, as discussed above, syntactic generalizations are missed. Second, the grammar rules which force semantic agreement grow quickly as the number of semantic values grow.

Thus, NLMenu has several major drawbacks. One is that its grammar and lexicon must be recompiled with a new scheme whenever the application domain changes. Also, the menu driven input paradigm becomes unwieldy as the grammar and lexicon grow. Further, complex domains result in a very large number of grammar rules, so that, in an application having complex queries, the size of the interface becomes extremely large, and its speed slow. NLMenu uses a predictive parser, but this parser only works for context-free grammars.

Therefore, in order to provide a better predictive parser, a parsing method according to the present invention accomodates a grammar and lexicon defined in terms of linguistic principles as well as metasemantic grammars (or core grammars). The grammar and lexicon, taken together, define a set of valid natural language sentence structures, with the precise words defined by the lexicon. The defined structures include information regarding features of the words. When words are read by the parser, these features become fixed within the structure.

The predictive parser preferably generates a set of valid next elements, and each incoming word is compared against the set. Words not in this set are rejected as invalid.

The novel features which characterize the present invention are defined by the appended claims. The foregoing and other objects and advantages of the present invention will hereafter appear, and for purposes of illustration, but not of limitation, a preferred embodiment is shown in the accompanying drawings.

BRIEF DESCRIPTION OF THE DRAWINGS

FIG. 2 is an example grammar for use with the method of FIG. 1;

FIG. 3 is an example lexicon for use with the method of FIG. 1;

FIG. 4 illustrates a chart of a completed parse; and

FIGS. 5-8 illustrate charts of partial parses.

DESCRIPTION OF THE PREFERRED EMBODIMENT

Figure 1:
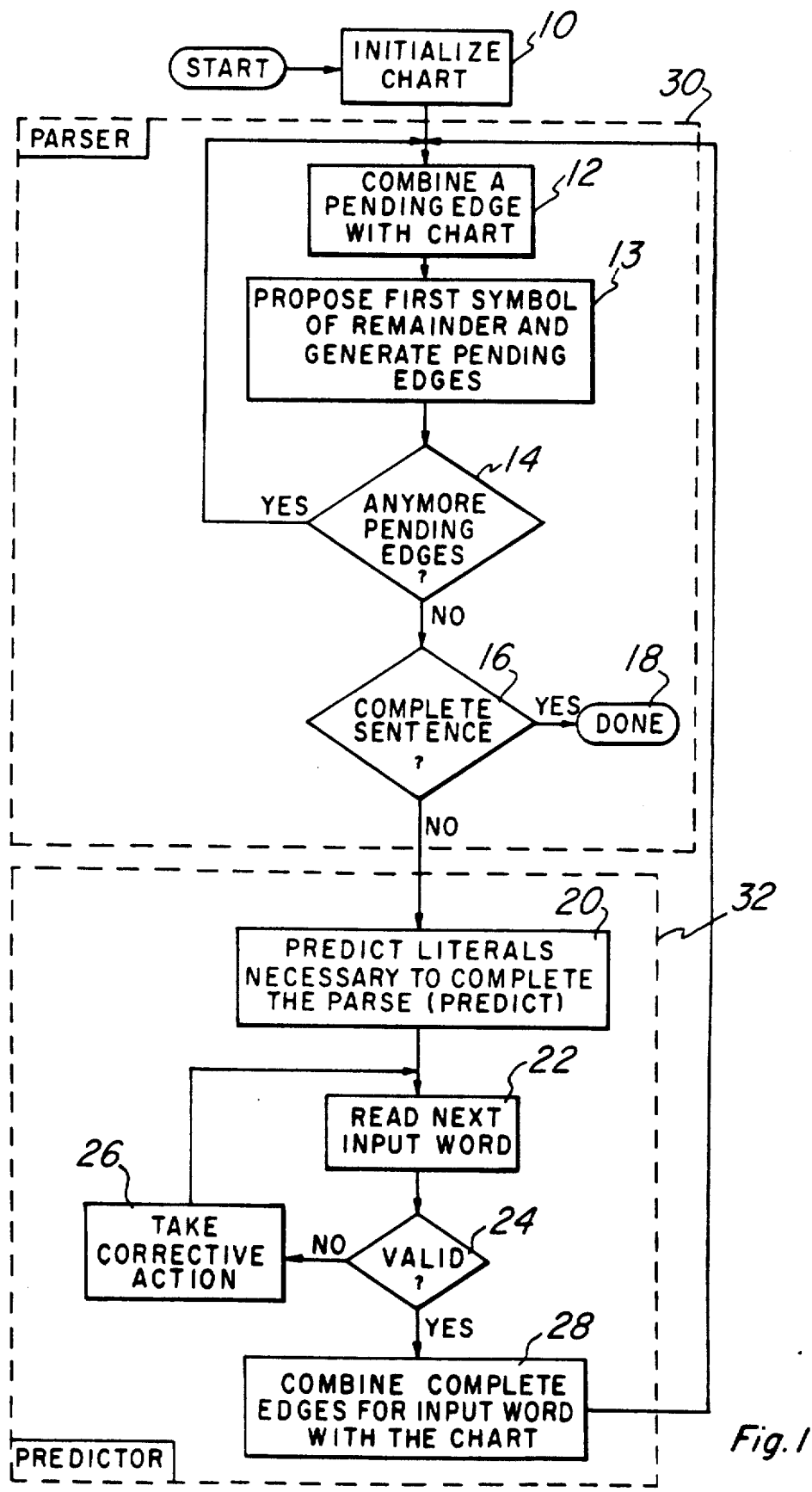
FIG. 1 is a flow chart of a method of parsing a stream of input words according to the present invention.

The present system and method will be described in the context of a natural language interface for a knowledge base system. For purposes of this embodiment, a knowledge base can generally be considered as a database with rules interrelating relations and defining new relations via rules. There will be two parts to the discussion. First, the general concepts will be explained in terms of a simple example. Second, the predictor and parser will be described in more detail.

In a preferred user interface according to the present invention, a user enters a query at a computer keyboard in the normal manner. As each word is entered, it is checked for legality in terms of a general grammar which is usually suitable for several different applications. Each word is checked automatically as it is entered by determining when a space is typed at the keyboard. If the most recently entered word is correct, a prediction is made of the set of allowable next words in the query, and the next entered word is compared against the resulting set. Whenever an illegal word is entered, some type of warning or error handler is invoked. In the preferred embodiment, an illegal entry causes a menu to be displayed for the user which contains the allowable next set of words. The user may then choose the next word by typing it at the keyboard or selecting it from the menu using a pointing device.

The preferred interface also provides for changes in the query. If the user decides that, for example, the most recently entered two words are not what was intended, he can backspace over them and continue entering his query. As the words are deleted, they are deleted from the current state of the parser as if they had never been entered.

The preferred embodiment provides for a natural language interface which is defined by a grammar, as well known in the computer science and computational linguistics arts, and a lexicon, which contains definitions of the terminal symbols of the grammar. These terminal grammar symbols are preferably word classification descriptors, such as *verb*, *noun* and *article*, with syntactic and semantic information. The terms of the lexicon are assigned *features*, such as tense, plurality, or definiteness, as will be described in more detail below. Some elements of the lexicon may actually be English words, especially those in common use such as the article *the* and *an*. Generally, however, the lexicon does not contain English words, but rather contains detailed descriptions of the types of words which are valid in certain circumstances. The actual words, also called atoms, are defined elsewhere, such as in a knowledge base.

The grammar and lexicon, taken together, are domain independent. This means that the grammar and lexicon can be compiled without reference to a particular domain. The result is to define a general natural language which can be a fairly complex subset of English. Since the rules of the grammar and lexicon refer only to word types, the number of rules is relatively small, even at execution time. Thus, the domain independent definition of the grammar is small and runs quickly.

Typical domains, which will be illustrated in the preferred embodiments, are applications for searching knowledge bases. A single grammar and lexicon can be used to access any number of knowledge bases, without change or recompilation, so long as the syntax and structure of the knowledge bases is the same. Thus, a single natural language grammatical interface can be used for many different applications. The grammar and lexicon define the sentence structure types which can be used, and the specific application domain supplies the precise words which are used to make up query sentences.

The general method used by the preferred processor for predictively analyzing sentences as they are entered is shown in FIG. 1. The general method preferably used is based on a chart parser as known in the art. (Terry Winograd, Language as a Cognitive Process, Vol. 1: Syntax, 1983). A chart as defined there consists of vertices and edges. As described below, the chart utilized by the present invention also uses data structures called pending edges.

The first step is to initialize the chart (step 10). This creates the start vertex and generates one or more pending edges; one for each possible basic sentence type defined by the grammar. The pending edges are then taken up by a *parser* (30), which combines them with a chart data structure (described later), and proposes additional pending edges, based on the grammar only. The steps undertaken by the parser (30) are 12,13,14,16, and 18. Step 12 combines a pending edge with the chart. The next step is to propose the first symbol of any remainder for that edge and generate pending edges for that symbol (step 13). If there is no remainder, no pending edges are generated. If there are any pending edges (step 14), control returns to step 12. Other wise, control passes to step 16. For the initial pass through the processor, the processor develops an initial set of valid first elements for the sentence. This consists of a set of terminals of the grammar, (Terminals of the grammar are defined in the lexicon).

The next step (16) is to determine whether a complete sentence has been parsed in accordance with the rules of the grammar. If so, control passes to step 18, which exits the procedure. In some cases, one complete sentence as defined by the grammar may be merely the first portion of a longer complete sentence. In such cases, if the shorter sentence is not desired by the user, control passes back to the normal flow immediately following step 16.

When control passes to step 20, the parser (30) is finished for now. Steps 20, 22, 24, 26, and 28 form a predictor (32). For a type-in predictor, the next step is to predict a set of terminal elements from the lexicon which are valid based upon the results of the previous step and which are necessary to complete the parse (step 20). If menus are used for input, the knowledge base is searched to find all valid instances of each valid element, and this list is presented to the user. The terminal lexical elements are determined by examining all active edges which currently exist in the chart. In many applications, terminals of the lexicon will consist of word classes, such as *verb* or *noun*, rather than actual English words, which would be defined only in the knowledge base.

The next step is to read the next word from the input device (step 22). A check is made to see if the next word is valid (step 24), which is done by seeing if that word, and all of its *features* including tense, plurality, etc., match with an element of the set of valid next elements from the lexicon. For type-in entry, this is simply a matter of looking up the entered word in the knowledge base, and matching its features as defined there with those required by the lexicon. For menu entry, the input word is simply compared against the just prepared list of valid words. If the next word read is invalid, the error is flagged, and corrective action is taken (step 26). Such action informs the user of an invalid entry, and is followed by a return to the read next word step (step 22).

The flagging of an error can occur in several ways. A simple sound or flash at the terminal to alert the user of an incorrect entry may be sufficient, or it may be desirable to present a menu to the user of valid next words. Generating such a menu would involve finding all words within the application domain which fall within one or more of the predicted valid next elements from the lexicon. This is equivalent to the searching which is always done with menu entry.

If the word is valid, an edge from the current last element of the chart is combined with the chart, and any incomplete subparts of the sentence are completed, if possible, up to the just entered word (step 28). This produces a new set of pending edges. Once the set is determined, the flow of control returns to the parser (30) at step 12, so the newly proposed pending edges can be combined with the chart.

A sample grammar and lexicon which can be used to illustrate the processor of FIG. 1 are shown in FIG. 2 (the grammar) and FIG. 3 (the lexicon). In this simple example, there is no separate knowledge base domain; the English words of the sentence (atoms) are included in the terminal elements of the lexicon. An example which uses a separate domain for the English words will be described in connection with Appendices A, B, and C.

In the grammar of FIG. 2, the term *lex(string)* simply stands for an atom representing a word. Words in upper case are variables, exactly like Prolog variables, which are not instantiated initially but which will be assigned values during the course of the parse. The underscore character "_" is also a variable (the Prolog void variable) which can become instantiated.

In this simple grammar, the only valid sentence structure s is one made up of a verb phrase *up* with an implied subject *you*. A valid verb phrase consists of a particular *verb*, plus an object which consists of a noun phrase *np*. A verb feature-set entered as part of the parse will be assigned to the variable V, and a noun phrase features-set will be assigned to the variable NP. The third line of the grammar shows that a noun phrase is the unification of two variables D and N, where D is a *determiner* feature-set followed by *N*, which is a *noun* feature-set.

The three lines beginning with *features* defines the feature-set for each word type (*noun, verb, determiner*) in our small example. A complete verb definition includes the *lex*, that is, the atom representing the word itself, a *predicate*, a *subject*, and an *object*. A word which is a noun has the features *lex, number* (i.e. singular or plural) and *sound*. The sound value of a noun indicates whether the noun begins with a vowel sound or a consonant sound. As is well known, nouns which begin with a vowel sound must sometimes be preceded with a different determiner than those which begin with a consonant sound.

The features of a determiner are the *spec*, which is similar to the lex of a noun or verb, the *spec_*type (definite or indefinite), the *number*, and the *sound*.

FIG. 3 shows a simple lexicon for use with the grammar of FIG. 2. This lexicon defines three determiners, *a, an* and *the*. The lexicon defines two verbs, *schedule* and *arrange*. Finally, four nouns are defined, being the singular and plural forms of the nouns *talk* and *interview*.

The definitions show that the determiner *a* is singular and precedes a consonant noun. *An* is singular and precedes nouns beginning with a vowel. Both *a* and *an* are indefinite. The determiner *the* is valid regardless of the number or sound of a following noun, and is a definite determiner.

The various features of the nouns are shown, and define some overlapping features (sound and number) as used with the determiners.

The verb definitions show that for either verb, the predicate, subject, and object are implied at all times. The predicate value takes the subject and object feature-sets as arguments for a later translation step.

The notation of the lexicon is very similar to that of the Prolog programming language. That is, procedures, titled *determiner, noun* and *verb* will always succeed (predicated by "true") for a word which matches a definition. The function of the remaining elements in the definition of the words in the lexicon is to assign values to the variables involved. For example, when the determiner *a* is encountered as part of a parse, *num* is forced to be singular and *sound* is forced to be consonant. This means that scanning of following nouns will only accept nouns having singular *number* and consonant *sound* as valid.

FIG. 4 shows a completed parse of the sentence *schedule an interview* for the grammar and lexicon of FIGS. 2 and 3. Each input word lies between 2 vertices. The vertices of FIG. 4 are connected by labelled edges. As shown in FIG. 4, *schedule* is a verb, *an* is a determiner and *interview* is a noun. Also, the phrase *an interview* is a noun phrase *np* as defined by line 3 of the grammar. The entire phrase is a verb phrase *vp* as defined by line2 of the grammar and the entire phrase is also a completed sentences *s* as defined by line 1 of the grammar. The sentence and verb part are co-extensive because our simple grammar has defined a sentence to consist only of a verb part with an implied subject *you*.

The notation used in FIG. 4 indicates much information about the state of the parse. The notation is the same as that used in the Winograd reference. Subscripts indicate vertices and the symbols are as described previously. Thus, $0s-\!>\!0\ vp$ shows an active sentence edge which starts and ends on vertex 0 and has a remainder of $vp$. $1np-\!>\!det_2noun$ defines the $np$ edge which starts on vertex 1, ends on vertex 2, has already seen a *det* and has a remainder of *noun*. Any symbols following the second vertex number are the remainder, while those preceding the second vertex but following the → ¿ have already been seen. Intermediate state edges are not removed from the chart.

The step-by-step method by which the processor of FIG. 1 parses the input sentence *schedule an interview* is illustrated in FIGS. 5 through 8.

Referring to FIG. 5, the chart is initialized. This consists of creating an initial vertex (vertex 0). Then, a pending edge for each possible sentence rule of the grammar is generated by proposing the start symbol as the start vertex. Since our grammar has only one possible form of sentence, there is only one pending edge. As described above, the pending edge is put in a list of pending edges, which will have only element in this example.

Control then passes to the parser. The parser adds the pending edge s to the chart as an active edge, which is represented as an edge which begins and ends on vertex 0. The parser then examines this active edge to see if any additional pending edges can be generated.

Pending edges are produced by proposing all symbols which are defined in the grammar and which can contribute to the current parse. The grammar defines a sentence as consisting of a verb phrase *vp*. Thus a pending edge for a verb phrase is generated, and a corresponding active edge is later added to the chart.

A verb phrase consists of the two consecutive constituents, *verb* and *np* as shown on line 2. Since *verb* is not defined further in the grammar there are no more symbols for the parser to propose, and control passes to the predict step (step 20). FIG. 5 shows the complete chart thus far.

The next step is to predict the literals which are valid next elements. The chart is searched for terminals needed to continue the parse, in this case a verb. In the lexicon shown, verb possibilities are *schedule* and *arrange*.

In our examples *schedule* is then typed by the user and compared with the list of valid next elements in the lexicon. Since only verbs are valid first words, *schedule* is compared against the verb entries in the lexicon. Since *schedule* is within a verb entry, and this entry's feature-set unifies with the verb feature-set in the chart, an edge containing the verb entry is added to the chart. This is shown in FIG. 6. This consists of creating a second vertex (vertex 1), and adding a complete *verb* edge between the first and second vertex. Since this satisfies the first element of the verb phrase *vp* definition, the *vp* edge is *continued* by adding a new edge between vertices 0 and 1 labelled *vp*. This is an active edge, because *vp* is not yet complete. Control then passes to the parse step (14).

The parse step consumes and produces new pending edges as described above. The grammar shows, on line 2, that, after a verb, the only valid continuation is a noun phrase. Thus, a pending edge is generated, and from that pending edge an active edge labelled *np* is created at vertex 1. No further proposals are possible based solely on the grammar, so control passes from the parse step.

Figure 7:
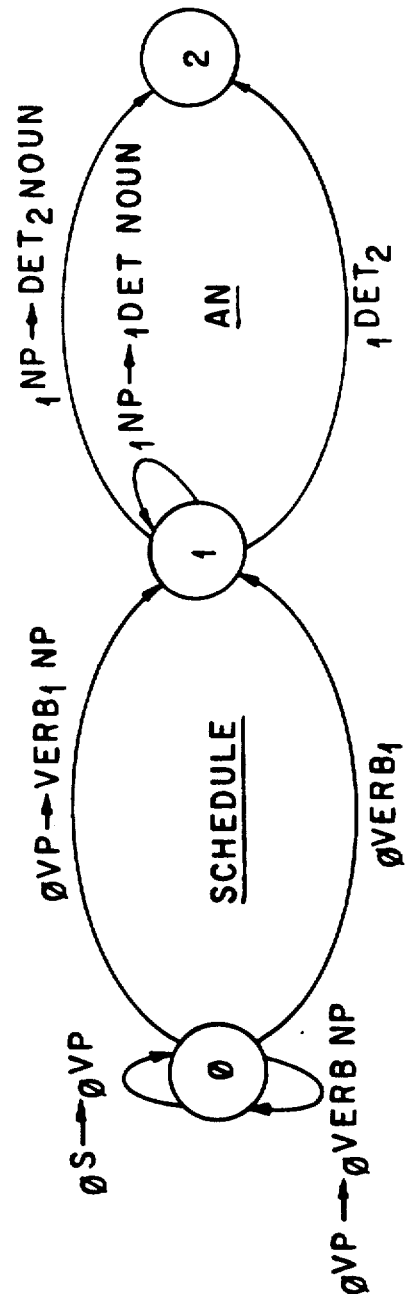

FIG. 7 shows the next pass through the processor. A *det* edge is added because the first element of an *np* is a *determiner*. The next word entered is compared against the valid entries for *determiner*. The next word selected is *an*. Since this is one of the valid determiners, vertex 2 is created and a complete *determiner* edge is added between vertices 1 and 2. At this point, there is an active *np* edge. A new, partially completed, active *np* edge is attached to the chart between nodes 1 and 2. The third line of the grammar shows that the only valid continuation for a noun phrase, after the determiner, is a noun.

At this point, it should be noted that the determiner *an* defines its *number* to be *singular* and its *sound* to be *vowel*. These features are unified with the next higher construct within the grammar, which is the noun phrase *np*. Thus, as soon as the determiner *an* is added to the chart, the *number* and *sound* of the entire noun phrase are forced to be singular and vowel. For a noun to be acceptable, it must also have the feature values singular and vowel.

Figure 8:
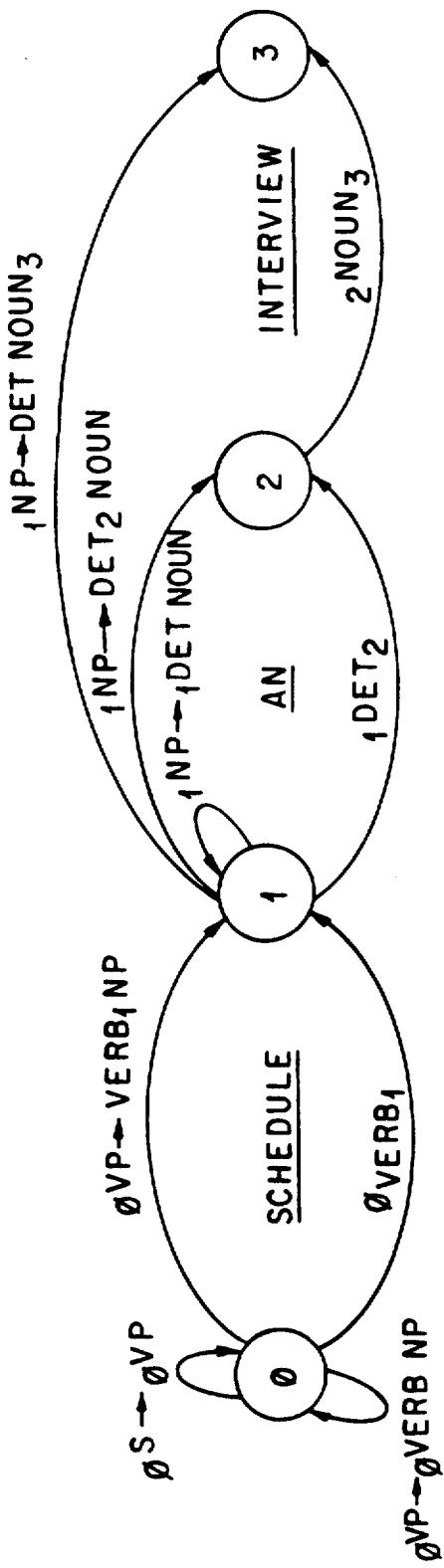

FIG. 8 shows the first part of the next pass through the processor. The predicted literals coming after *an* are found by determining which nouns in the lexicon have the values singular and vowel. The lexicon shows that the only valid noun which can be used to complete the noun phrase is *interview*. When the next word is read in, if any version of *talk*, or the plural *interviews*, is entered, it will be rejected as not being consistent with the values already instantiated in the noun phrase. When *interview* is entered, it is determined to be a valid noun, and the noun edge of the chart is connected to a newly created vertex 3. The chart shows that the active edge *np* is now complete, inasmuch as there is a determiner followed by a noun. Thus, a complete *np* active adge can be added between verticles 1 and 3. This is the status of the chart as shown in FIG. 8.

Since we now have a verb followed by a noun phrase, the *vp* active edge, and hence the *s* active edge, can also form complete edges, resulting in the original completed chart of FIG. 4. Since the test of step 16 (further defined later) shows that a complete sentence has been parsed, the processor is done and exits.

Note that all partial results are retained. That is, when active edges are added to the chart, they are never removed. Instead, when an active edge is continued, a new active or complete edge is added. This supports ambiguity and allows the user to change his mind. If he wants to delete the previous word, only the last added edges are removed, and such removal restores the chart to precisely the state it was in before the deleted word was entered.

The above simple example illustrates how the parser may incorporate grammatical features to constrain the set of next possible valid elements and ensure that only syntactically and semantically valid sentences result. The number and sound of the example sentence were undetermined until the word *an* defined values for those variables. Once a value for these variables was defined, the values were required to be consistent with any remaining parts of the sentence in which they were involved. Such instantation is a natural feature of the Prolog programming language, and provides a highly efficient unification method for parsing.

In the example described above, the actual English words were contained in the lexicon. In a more complicated application, the lexicon would most likely contain determiners, but would contain only lexical rules for nouns and verbs. These rules would define variables for the *lex*, *num*, and *sound* of the nouns, and the *lex* and *pred* of verbs.

In such a more sophisticated system, the processor would have to look in the domain, or knowledge base through the lexicon, to determine whether an entered word was an appropriate noun or verb. The knowledge base would contain the precise noun and verb definitions, through entries in the lexicon, looking very much like those definitions as given in the example lexicon. The grammar and lexicon would thus be domain independent, and valid sentences would be generated based upon the contents of the knowledge base. Knowledge bases are relatively simple to modify, so that the precise acceptable sentences defined by the grammar can be easily varied. For example, forms of the noun *party* could easily be added to the knowledge base without changing the grammar and lexicon. A simple addition of this element to the knowledge base extends the sentences allowed by the grammar to include sentences such as "arrange the parties" and "schedule a party".

The predictor and parser used in FIG. 1 will now be described in more detail.

An active chart parser drives the construction of constituent structures constrained by the creation of feature sets. Winograd's chart parser algorithm has been modified to make it operate in a predictive manner. As the parse grows it acts like a normal chart parser, performing both top-down and bottom-up actions.

The following description of the active chart parser adopts the definitions found in Winograd. The definitions were modified to allow parsing with the production of feature-sets, rather than just constituent structures.

An active chart consists of a sequence of *vertices*, a set of *edges*, and a set of *pending edges*. These form a record of the constituents and partial constituents produced during the parse.

The active chart forms the working data structure for the active chart passing algorithm. The inputs to this algorithm are a hornclause grammar, a deductive lexicon, and a set of words.

A chart *edge* consists of a starting and ending vertex in the chart, a nonterminal or terminal symbol forming the label of the edge, a possibly empty set of terminals and nonterminals forming the set of symbols seen, and a possibly empty set of terminal and nonterminal symbols forming the remainder of the edge.

An edge is represented as the structure:

*edge(Start, End, Label, Seen, Remainder)* where the arguments have the meanings described above. An edge is complete if its remainder is empty. Otherwise it is active. Complete edges are sometimes called passive edges.

A *pending edge* is an edge which has been proposed, but not yet entered into the chart. The pending edges are placed into a queue, stack or some other data structure known in the art depending on whether a more top-down, bottom-up, or some combination of the two strategies is desired in the parsing algorithm.

An edge, *edge(Start, End, Label, Seen, Remainder)*, is an incoming edge relative to a vertex $v$ if $End=v$. It is an outgoing edge if $v=Start$.

The active chart parser consistss of five primary procedures: initialization, chart extension, edge combination, edge continuation, and edge proposal. The following description of the algorithm includes provisions for parsing and prediction.

The chart is initialized by first proposing the distinguished symbol of the grammar (usually $S$) at the vertex 0. This has the effect of producing at least one pending edge. Next, the parse procedure (described below) is invoked with an empty set of input words. This has the effect of combining all applicable grammar rules into the chart in a top-down manner heading towards the left corner of the eventual parse tree. The results is a set of active edges in the initialized chart and an empty set of pending edges. of course the parse procedure fails to find a complete sentence given an empty set of words.

Next, normal predictive parsing begins. This consists of a cycle between predicting and parsing which terminates when the parse procedure successfully parses a sentence and either no more sentences are possible or the user decides to accept a generated sentence. For a well-formed grammar and lexicon, a sentence will always be reached. The prediction procedure will be described later.

Once the user chooses a word, the chart is extended. This process corresponds roughly to the initialization procedure described in Winograd. Every definition for the chosen word corresponds to the chosen lexical class (or set of classes) is added to the chart. This is accomplished by the following three steps: add a new vertex to the end of the chart, create a new edge for every termimal described above in the following format:

*edge(next_to_last_vertex, last_vertex, lexical_category, [word], [])* using the same format previously described for edges. Next, each new edge is combined with the chart (all of the new edges are complete and combination adds edges to the chart). The result is an exteded chart, a modified set of edges, and a set of new pending edges.

The actual parsing process is composed of two steps: edge combination and edge proposal. Each edge in the set of pending edges is combined with the chart. If the edge is active, then the first symbol of its remainder is proposed at its ending vertex in the chart. Any newly generated pending edges are added to the set of pending edges at each step of the parse. The process ends when the set of pending edges becomes empty.

The parse succeeds if there is a complete edge with the following attributes: a starting vertex of zero (the first vertex in the chart), an ending vertex equal to the last element of the vertices of the chart, and a label of $S$. Note that all pending edges must be used before the test for success can take place. This is because all possible paths are being explored. The chart is also being extended to the next frontier (the parse is not necessarily at the end of the sentence chosen by the user). This allows the parsing of longer sentences which include valid complete sentences as their first part.

To combine an edge with the chart, the edge is added to the chart before invocation of the continuation process. If the edge is complete, then for each of the active incoming edges of its starting vertex an attempt is made to continue the incoming edge with the complete edge. If the edge is active, then for each of the complete outgoing edges of its ending vertex an attempt is made to continue the active edge with the outgoing edge. If the label of the complete edge is the same as the first symbol of the remainder of the active edge, then a new continued edge is created. This comparison includes the feature sets of the edges.

Edge continuation attempts to continue an active edge from a complete edge where the ending vertex of the active edge is the ending vertex of the complete edge. The new edge has a copy of the label of the active edge (it is being continued), a starting vertex equal to the starting vertex of the active edge, an ending vertex equal to the ending vertex of the complete edge, a *Seen* set equal to the active *Seen* set with a copy of the label of the complete edge appended to the end, and a *Remainder* which is a copy of the *Remainder* of the active edge with the first element removed. This new edge is added to the set of pending edges if there is not an edge already in this set which differs only by its *Seen* set.

Once an edge is combined with the chart, the first symbol of its remainder is proposed at its ending vertex. Of course only active edges have remainders. The symbol is not proposed if it has already been proposed at that vertex. This is true if there is an edge or pending edge with a *Label* equivalent to the symbol and a starting vertex equal to the vertex. Next, for each grammar rule having the category as its left-hand side, a new edge is added to the set of pending edges with the following properties: the starting and ending vertices are equivalent to the vertex, the label is the symbol being proposed, the set of symbols seen is empty, and the remainder is just the right hand side of the grammar rule. This procedure corresponds to normal top-down parsing. If any of these proposed edges should later become complete, the symbol proposed at the vertex in the original edge (and possibly others) will be moved from the set of remainder symbols to the set of symbols seen.

The predictor works in conjunction with the chart parser and the lexicon. It uses the lexicon directly and drives the operation of the chart parser.

The predictor initiates predictive parsing by first invoking the chart initialization predicate. The result of this initialization is a chart of edges all starting from vertex zero and ending at vertex zero. This initial chart allows commencement of the predict, parse cycle.

To find the next set of legal lexical choices, the predictor scans through the set of edges where the ending vertex is equivalent to the current vertex and chooses those acive edges which have a terminal symbol for the first element of the *Remainder*. These edges are waiting on lexical entries for continuation. The terminal symbols are used to select lexical items. As each lexical item is tried, its effects are undone on backtracking. This allows lexical items with incompatible feature-sets to proceed on to the succeeding stage. For example, the singular and plural forms of the word *fish* have incompatible number values, but each may follow the determiner *the* which has no number value.

Once a set of lexical items that will extend the active chart is identified, the user must make a selection. The lexical items are presented by their lexical class (or a grouping thereof) and the atom representing the lexical choice. Lexical ambiguity is possible at this point. For example, no distinction is made between the plural or singular *fish*.

Next, the set of lexical items representing the intersection between the possible lexical items which would extend the chart and those which are compatible with the user's choice are combined as complete edges with the chart. Once all the user's lexical choices are processed, the predictor invokes the parser with a null set of words (but with a new last vertex for the chart). As described previously, this process exhausts the supply of pending edges and appropriately combines all edges which may combine considering the addition of the new complete edges corresponding to each lexical entry. This sets the stage for the next prediction cycle. Of course, the parse may be complete after this parse cycle and the user is given the opportunity to accept the discovered parse if this occurs.

Lexical transformation rules may be declaratively stated directly as Prolog clauses. Also, by writing the appropriate lexical interface predicates, natural language interfaces may execute directly from the knowledge base scheme in a transparent manner, requiring no grammar compilation phase whatsoever.

As was alluded to earlier, the Prolog programming language lends itself very nicely to implementation of the processing methods described above. Grammars using the formalism illustrated in FIG. 2, and lexicons using the formalism illustrated in FIG. 3, can be easily translated into Prolog horn clauses. The translator can be used to translate almost any grammar and any lexicon into Prolog which can be processed by the preferred processor. Source code listings of the preferred processor and predictor, also written in Prolog, are attached hereto as Appendices D and E, and incorporated by reference.

Translation of the grammar and lexicon into standard Prolog is straightforward. The grammar is simply an infix form of the standard Prolog (prefix form) fact, which improves readability. A grammar statement of the form *left-side*"- - - >*right-side*" is equivalent to the Prolog fact "- - - > (*left-side, right-side*)", where the grammar functor "- - - >" is called "rewrite". A statement in the lexicon of the form "*left-side*: - - - *right-side*" is equivalent to ": - - - (*left-side, right-side*)", where ": - - - " is an implication functor. Since Prolog examines arguments based strictly on their location within the predicate, the translator also expands the predicates of the left-side and right-side to include all features defined in the *features* predicates, and in the same order. If not all features are required for a predicate, the Prolog translation can leave out those which are unnecessary.

The aspect of the Prolog programming language which makes it especially suitable to implementation of the present system and method is unification of logical variables. As described above, the preferred method for insuring consistency of the words in a sentence is to leave them undefined until parsing actually begins. As words in the sentence restrict the choice of following words, the appropriate variables are assigned values as defined in the lexicon or knowledge base. This corresponds to the instantiation of variables in Prolog. Once a variable is instantiated, all occurrences of that variable will match in order to give true results. Thus, lexical features, such as plurality, definiteness, tense, etc., are not determined until after parsing of the sentence begins, but are forced to remain consistent throughout the parse. As described above, this is one of the natural operational features of the Prolog language.

Delaying determination of linguistic features until parse time greatly simplifies the grammar and lexicon of the preferred embodiment. The grammar and lexicon need only describe sentence structure in terms of parts of grammar (e.g. nouns and verbs). The older method results in much larger and more complex grammars, with an associated slowing of operation at run time. This is true in prior art parsers such as NLMenu, and semantic grammar parsers generally, which fully instantiate the core grammar with domain information at compile time, resulting in a single block of computer code which contains all of the rules needed to parse input.

A more complex grammar for use with the present invention is shown in attached Appendix A. That grammar defines a sentence to consist only of a verb phrase *vp*. However, in contrast to the example of FIG. 2, that grammar gives two alternative legal verb phrases, with one consisting of a *verb* followed by a noun phrase *np*, and the other consisting of a *verb* followed by an *np* followed by a prepositional phrase sequence *pps*.

Prepositional phrase sequences *pps* can be a prepositional phrase *pp* having only a head part, or they can be a *pp* having a head followed by another *pps* producing a tail. A *pp* is defined to be a preposition followed by a noun phrase. Complete structure of the sentences allowed by the grammar can be seen by examining the remainder of the rules in the grammar.

The lexicon for this more complicated example is shown as Appendix B. As can be seen by examining hte lexicon, particular nouns, verbs, and so forth are generally not set forth in the lexicon. Instead, the lexicon defines the relationships between the various features which give rise to legal sentences. The features used in the lexicon are shown in the *features* section of the grammar as in the previous example.

As shown, determiners are completely defined within the lexicon. This is the case because the right-hand side of the definition is *true*, as were all definitions in the lexicon of FIG. 3. Lexicon entries which have Prolog predicates on the right-hand-side look to the knowledge base to see if they are satisfied. There are four different noun definitions, all of which have one or more Prolog predicates on the right-hand-side of the implication functor (: - - -). Whether or not any of these definitions are satisfied by any given noun depends on the contents of the knowledge base.

A single entry defines verbs in general. In addition, lexical definitions are given for the verbs *enable, disable,* and *compare*. These can be considered as special cases. Recall that all words beginning with a capital letter are Prolog variables.

The combination of the grammar and lexicon for the more complicated example does not enumerate any actual legal sentences. However, a very large number of legal sentence structures are defined by the combination of this grammar and lexicon. These can be compiled independently of any particular domain, i.e. knowledge base, and standing alone define a set of legal English sentence structures.

One knowledge base for use with the grammar and lexicon of Appendices A and B is attached as Appendix C. This knowledge base consist of a large number of facts and relationships between them. This knowledge base, combined with the grammar and lexicon just described, implements a system for determining interview results for a number of fictitious persons.

In summary, in the preferred embodiment, a grammar, lexicon, and knowledge base are provided. The parsing procedure is broken into two general steps, which are done by a predictor and a parser. The predictor considers any active next elements from the grammar, and determines which lexical entries will be valid for a next input word. It reads the input word, and determines if it is valid by accessing the knowledge base using the rules of the lexicon.

The parser accepts partial sentences and, using only the grammar, produces all possible continuations in terms of symbols of the grammar. Both procedures utilize a data structure known as a chart, which keeps track of the current state of active and complete edges used in the parsing process.

The processor described is also capable of generation. There are only two differences between recognition and generation: first, in generation, the start literal includes a partially instantiated feature-set and second, the user does not choose among predicted words (the system does, usually choosing the first word). For example, given a start literal of s({stem(schedule), obj({stem(talk), spec_type(indef)})})

the system will generate the sentence "Schedule a talk" and not "Schedule an talk" or "Schedule the talks".

The parsing process produces a completely instantiated s featureset:

---
s({stem(schedule),
    obj({stem(talk), spec_type(indef),spec(a),
        num(singular),sound(consonant),lex(talk)}),
    subj({lex(you)}),
    lex(schedule),
    pred(schedule(subj,obj))})
---

A strategic component decides what to say via the partially instantiated s feature-set and the parser with the grammar and lexicon serve as the tactical component, deciding how to construct the desired sentence. In other words, given a partial sentence, the parser can build a complete sentence which is linguistically correct according to the grammar.

TECHNICAL ADVANTAGES

The described parsing engine provides several important advantages over the prior art. A grammar and lexicon can be defined that set forth the structure of all allowable sentences. They can then be combined with a knowledge base or other domain to determine the complete set of allowable natural language sentences. The set of allowable sentences can be easily modified by modifying the application domain description. The grammar and lexicon can be created separately, and do not need recompilation when used with a new or modified knowledge base.

This provides important benefits over prior art systems, which instantiate the domain into the grammar to generate a large body of rules which completely define the grammar. The present grammar and lexicon are small and simple, and execute relatively quickly. This is important for predictive parsing, because a prediction must be made after every input word is received. The parsing engine used can predictively indicate an invalid entry and, if desired, provide a set of valid next words to the user. A user can back up within the sentence, if desired, and proceed from an earlier point.

More complex grammars than that attached as Appendix A have been implemented on an Explorer, a symbolic computer manufactured by Texas Instruments, and can keep up with a typist entering approximately 40 words per minute. When menus are not used, the speed is independent of the size of the knowledge base. Thus, enlarging the knowledge base does not adversely effect operation of the system, with the only extra delay being caused by the time it takes to search the larger knowledge base for a single entry. Reasonably efficient knowledge base searching techniques make this small extra delay transparent to the user.

Although the preferred embodiment is described in terms of parsing a sentence which a user types at a keyboard, it easily accommodates other types of input. Menus can be generated for all predictions if desired, allowing a user to select valid entries with a pointing device. This does slow down the operation of the system, however, as a comprehensive search of the knowledge base must be made before each typed or menu selected word can be selected. Speech input can be used instead, with the speech being translated into text, and the text used as input to the parser.

The described system works well with or without menus. Menus can be used to assist a user unfamiliar with a particular application, and then normal type-in entry can be used when that user becomes more proficient.

The preferred embodiment has used the English language to illustrate natural language processing. However, other natural languages may obviously be used, as may artificial languages such as computer programming languages. Any language which may be effectively described by a Type I grammar (context-sensitive) may be processed by the described engine, although Type II grammars are preferred for parsing effeciency.

The present invention has been illustrated by the embodiment described above, and it will become apparent to those skilled in the art that various modifications and alterations may be made thereto. Such variations fall within the spirit of the present invention, the scope of which is defined by the appended claims.

What is claimed is:

1. A method for recognizing a sentence having a plurality of words, performed by a computer and comprising the steps of:
   (a) accepting a predefined grammar having terminal and non-terminal elements for defining allowable sentence structues;
   (b) accepting a predefined lexicon having entries for defining terminal elements of the grammar in terms of linguistic or semantic features;
   (c) predicting valid next lexical entries for any current partial sentences according to the grammar;
   (d) reading input words;
   (e) comparing features of the input words with the features of the valid next lexical entries;
   (f) rejecting input words which have features which do not match valid next lexical entries;
   (g) accepting input words which have features which match a valid next lexical entry;
   (h) generating partial sentences by combining accepted input words consistent with the grammar and lexicon;
   (i) unifying the lexical features of the words forming the partial sentences so that the partial sentences are self-consistent with respect to such features; and
   (j) repeating steps (c) through (i) until a complete sentence is formed as defined in the grammar.

2. A method for recognizing a sentence according to claim 1, further comprising the steps of:
   (k) before step (c), providing a knowledge base having a plurality of words and associated lexical features; and wherein step (e) comprises the steps of:
   (l) comparing the input words to those contained in the knowledge base;
   (m) defining input words which are not contained in the knowledge base as not matching a valid next lexical entry; and
   (n) for words contained in the knowledge base, comparing their associated lexical features with the features of the valid next lexical entries.

3. A method for recognizing a sentence according to claim 1, wherein step (h) comprises the steps of:
   (o) appending each accepted input word to the end of any existing partial sentence;
   (p) examining the grammar to determine a set of all valid terminal elements which can follow a terminal element represented by the accepted input word; and
   (q) proposing the terminal elements determined in step (p) as valid continuations of the partial sentence.

4. A method for recognizing a sentence according to claim 3, wherein step (c) comprises the steps of:
   (r) for any terminal element proposed in step (q), determining from the lexicon the features defined therefor; and
   (s) determining word and partial sentence features which are set by the current partial sentence.

5. A method for recognizing a sentence according to claim 1, wherein the number of features for the words is substantially less than the number of words which make the valid next lexical entries.

6. A method for recognizing a sentence according to claim 1, wherein the features compared in step (e) are lexical features.

7. A method for recognizing a sentence according to claim 6, wherein the lexical features are taken from the set spec, lex, stem, predicate, subject, object, number, sound, and definiteness.

8. A system, having a grammar and a lexicon, for recognizing a natural language sentence having a plurality of words, comprising:
   input means for reading words;
   a parser comprising:
      means for retrieving rules from said grammar for combining words into partial sentences,
      means for generating sets of a valid next elements for the partial sentences according to said rules, and
      means for determining whether the partial sentences are complete as defined by said rules; and
   a predictor coupled to said input means, comprising:
      means for retrieving features from said lexicon,
      means for predicting the features of said valid next elements,
      means for comparing words read by said input means with words in said lexicon,
      means for rejecting words having features supplied by said lexicon which are not consistent with said predicted features of a valid next element, and
      means for unifying lexical features of the words forming said partial sentences so that said partial sentences are self-consistent with respect to such lexical features.

9. A system according to claim 8, further comprising a knowledge base for supplying features of words, wherein said predictor is coupled to said knowledge base and wherein at least some words read by said input means are compared with words in said knowledge base, and wherein, for those words, features which must be consistent with those of a valid next element are taken from said knowledge base.

10. A system according to claim 8, further comprising means for generating chart, wherein the chart is accessed by said parser and said predictor for storing intermediate results.

11. A system according to claim 10, wherein the chart comprises edges, vertices, and pending edges of symbols to be transformed into edges.

12. A system according to claim 8, wherein the features of words and grammatical elements comprise lexical features.

13. A system according to claim 8, wherein said input means reads words serially, and wherein said parser and said predictor are invoked between each input word read by said input means.

14. A method for recognizing a sentence having a plurality of words, performed by a computer and comprising the steps of:
   (a) accepting lexical features for words;
   (b) predicting a set of valid next input words according to a grammar;
   (c) reading an input word;
   (d) for a valid input word, appending the input word to a partial sentence to generate a new partial sentence;
   (e) unifying the lexical features of the words forming the new partial sentence so that the new partial sentence is self-consistent with respect to such lexical features; and
   (f) repeating steps (b) through (e) until a complete sentence is formed according to the grammar.

15. A method according to claim 14, wherein step (e) comprises the step of:

(g) for all lexical features which are yet undefined by the partial sentence, and which are defined by the valid input word, defining such features for the new partial sentence to be the same as defined for the valid input word.

16. A system, having a grammar and a lexicon, for parsing a natural language sentence having a plurality of words, comprising:
   input means for reading words;
   means for retrieving rules from said grammar;
   means for retrieving features from said lexicon;
   means coupled to said input means and said feature retrieving means for instantiating the features of words read by said input means at a sentence creation time; and
   means for combining the words into sentences according to said rules retrieved from said grammar.

17. A system according to claim 16, wherein said input means reads words serially, and wherein said instantiation means is invoked between each input word read by said input means.

18. A system according to claim 16, wherein said input means supplies a partially instantiated feature-set, and wherein said instantiation means is invoked once on such partially instantiated feature-set, whereby a valid sentence according to said grammar is generated.

19. A system according to claim 16, further comprising:
   a knowledge base coupled to said instantiating means for defining features of the elements of said grammar, wherein the elements are fully defined by a combination of said lexicon and said knowledge base.

* * * * *